United States Patent

Bischofberger et al.

(10) Patent No.: US 6,877,473 B2
(45) Date of Patent: Apr. 12, 2005

(54) DIESEL ENGINE PISTON

(75) Inventors: Ulrich Bischofberger, Esslingen (DE);
Wilfried Sander, Neckarsulm (DE);
Michael Ullrich, Möglingen (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 10/311,243

(22) PCT Filed: May 22, 2001

(86) PCT No.: PCT/DE01/01941
§ 371 (c)(1),
(2), (4) Date: May 30, 2003

(87) PCT Pub. No.: WO01/96726
PCT Pub. Date: Dec. 20, 2001

(65) Prior Publication Data
US 2003/0196547 A1 Oct. 23, 2003

(30) Foreign Application Priority Data
Jun. 16, 2000 (DE) .......................... 100 29 810

(51) Int. Cl.[7] ................................................ B22F 7/00
(52) U.S. Cl. .............................. 123/193.6; 29/888.048; 427/456
(58) Field of Search ...................... 123/193.6; 427/456; 29/888.045, 888.048

(56) References Cited

U.S. PATENT DOCUMENTS

| 3,251,349 A | 1/1964 | Isley |
| 4,711,208 A * | 12/1987 | Sander et al. ............... 123/271 |
| 5,063,894 A | 11/1991 | Mielke et al. |
| 5,169,674 A * | 12/1992 | Miller ......................... 427/456 |
| 5,352,538 A | 10/1994 | Takeda et al. |
| 5,384,200 A * | 1/1995 | Giles et al. ................. 428/552 |
| 5,985,368 A * | 11/1999 | Sangeeta et al. ......... 427/376.4 |
| 6,006,516 A * | 12/1999 | Voss et al. .................... 60/299 |
| 6,256,984 B1 * | 7/2001 | Voss et al. .................... 60/299 |
| 6,372,299 B1 * | 4/2002 | Thompson et al. ......... 427/456 |
| 6,562,483 B1 * | 5/2003 | Thompson et al. ......... 428/632 |

FOREIGN PATENT DOCUMENTS

| DE | 1122325 | 12/1958 |
| DE | 2124595 | 5/1971 |
| DE | 29 48 057 | 11/1979 |
| DE | 3235165 | 9/1982 |
| DE | 222930 | 12/1983 |
| DE | 3827008 | 8/1988 |
| DE | 29600036 | 2/1996 |
| DE | 19902864 | 1/1999 |
| FR | 2326584 | 9/1976 |
| JP | 58167849 | 10/1983 |
| JP | 59150948 | 8/1984 |
| JP | 59180050 | 10/1984 |
| JP | 62186043 | 8/1987 |
| JP | 05001622 | 1/1993 |

* cited by examiner

Primary Examiner—Marguerite McMahon
(74) Attorney, Agent, or Firm—Collard & Roe, P.C.

(57) ABSTRACT

The invention relates to a piston for a diesel engine comprising a combustion cavity. The piston crown and the cavity are plasma-sprayed with a coating. The aim of the invention is to produce the coating in a cost-effective manner. To achieve this, the layer thickness of the coating is uneven, being thicker in the border region of the cavity.

3 Claims, 1 Drawing Sheet

DIESEL ENGINE PISTON

CROSS REFERENCE TO RELATED APPLICATIONS

Figure 1:
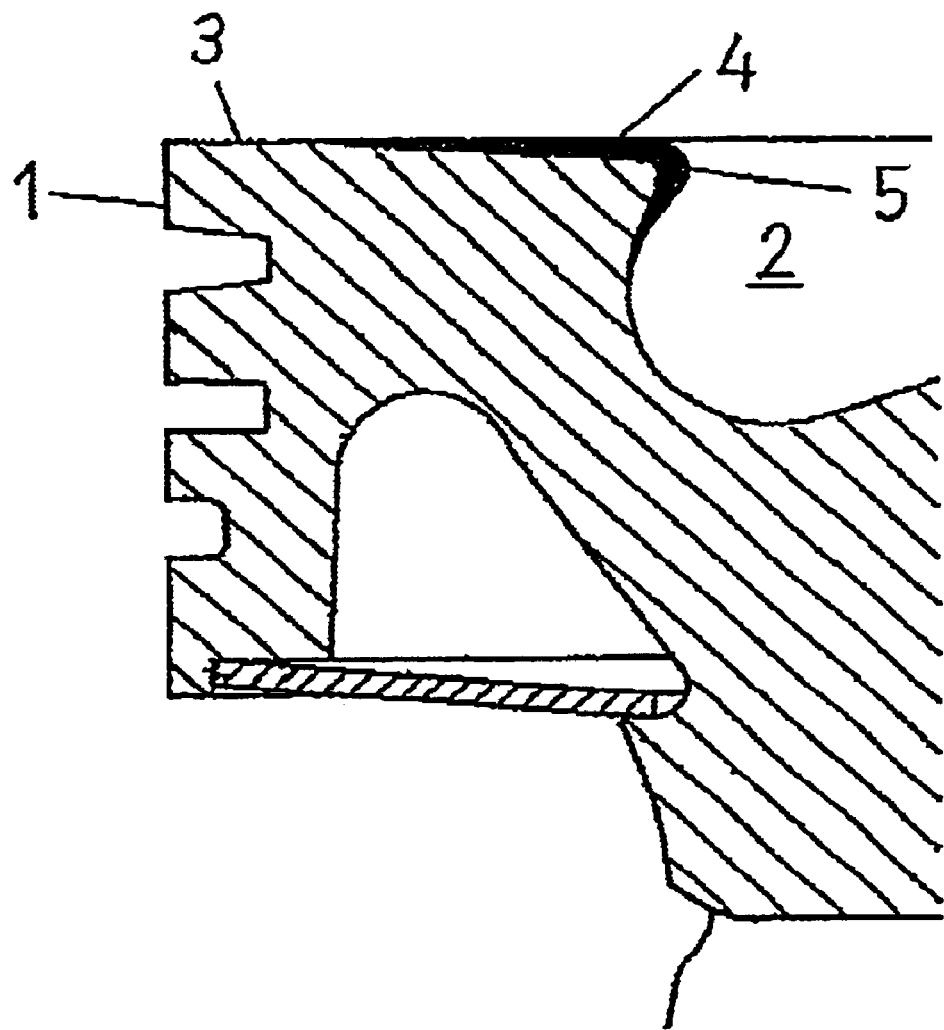

Applicants claim priority under 35 U.S.C. §119 of German Application No. 100 29 810.9, filed on Jun. 16, 2000. Applicants also claim priority under 35 U.S.C. §365 of PCT/DE01/01941, filed on May 22, 2001. The international application under PCT article 21(2) was not published in English.

The invention relates to a piston for a diesel engine in accordance with the preamble of Claim 1.

It is known from the SAE Paper 860888 "In-Service Performance of Ceramic and Metallic Coatings in Diesel Engines" that corrosion can be prevented in diesel pistons by means of coating the piston crown with MCrAlY plasma spray coatings. However, the results presented there are purely research results and have not found any use in practice up to the present, and the spray layers indicated for corrosion protection have always been considered in combination with layers of zirconium dioxide, for which they act as an adhesion layer and a corrosion protection layer. No detailed information about the implementation of the layer is provided in the SAE paper.

The invention therefore deals with the problem of making such spray layers usable for series production, also with regard to economically efficient production.

This problem is solved by means of the characterizing feature of Claim 1. Advantageous further developments are the object of the dependent claims.

A piston of this type is also known from DE 29600036. In the case of this piston, oxidation of the piston crown and of the combustion cavity is supposed to be prevented in that a layer of an aluminum alloy or of ceramic, particularly of zirconium dioxide or other temperature-resistant oxides, is applied to the piston crown.

It is merely optional there to also apply a corrosion protection layer of a NiCrAl alloy on the piston crown, between the ceramic layer and the base material.

The production of such a coating, consisting of a ceramic layer and another layer of an alloy, is complicated, time-consuming, and therefore expensive.

Coatings according to the invention therefore preferably do not have any additional ceramic coating, but rather consist exclusively of a MCrAlY layer, where M represents the metals Ni, Fe, and Co.

The thickness of the spray layer according to the invention varies and is greatest in the region of the cavity edge, while it decreases radially towards the outside on the piston crown, and towards the cavity bottom in the cavity.

The piston crown, in particular, but also the cavity, can be recessed in the region of the coating, by means of lathing work, in such a manner that the coating ends approximately flush with the piston crown, so that the surfaces of the uncoated region of the piston crown and of the coated region lie in the same plane, and that the same compression ratio prevails as for the uncoated piston.

The layer thickness generally lies in the range of 50 $\mu$m–500 $\mu$m, preferably 200 $\mu$m–400 $\mu$m at the cavity edge. Plasma spraying is preferred as the method for production of the layer.

The invention will be explained in greater detail below, on the basis of an exemplary embodiment. The drawing shows:

FIG. 1 the piston crown of a piston according to the invention.

The piston crown 1, which is made of steel, has a combustion cavity 2 and a surface 3 that faces the cylinder head. A plasma spray layer 4 that covers the surface 3 and the combustion cavity 2, at least in part, has its greatest thickness in the region of the cavity edge 5, and the layer thickness decreases radially towards the outside and towards the cavity bottom. In this connection, the spray layer is not shown to scale, but rather enlarged to make the progression of the layer thickness clear.

What is claimed is:

1. Piston for a diesel engine, in which at least the piston crown consists of steel, with a combustion cavity and a coating of a NiCrAl alloy or a CoCrAl alloy, a mixture of both alloys, or an FeCrAl alloy applied to the surface of the piston crown that faces the cylinder head, by means of thermal spraying, characterized in that the greatest layer thickness is present in the region of the cavity edge, and the layer thickness decreases radially towards the outside on the piston crown, and towards the cavity bottom in the combustion cavity, and the coating is present as the sole thermal spray layer on the piston.

2. Piston for a diesel engine according to claim 1, characterized in that the coating additionally contains yttrium.

3. Piston according to claim 1, characterized in that the piston crown and the combustion cavity are recessed before the coating process, by means of lathing work, approximately to such an extent that corresponds to the layer thickness of the layer to be applied later, in order to achieve the same compression ratio as in the case of the uncoated piston.

* * * * *